United States Patent [19]

Davis

[11] Patent Number: 4,868,381
[45] Date of Patent: Sep. 19, 1989

[54] FIBER OPTIC INTERFEROMETRIC THERMOMETER

[75] Inventor: Charles M. Davis, Herndon, Va.

[73] Assignee: Optical Technologies, Inc., Herndon, Va.

[21] Appl. No.: 148,582

[22] Filed: Jan. 26, 1988

Related U.S. Application Data

[62] Division of Ser. No. 915,110, Oct. 3, 1986, Pat. No. 4,755,668.

[51] Int. Cl.$^4$ .............................. H01J 5/16; G01B 9/02
[52] U.S. Cl. ...................................... 250/227; 356/345
[58] Field of Search ............... 356/345, 358, 352, 349, 356/351; 250/227; 374/161, 162

[56] References Cited

U.S. PATENT DOCUMENTS

| | | | |
|---|---|---|---|
| 3,136,310 | 6/1964 | Meltzer. | |
| 4,151,747 | 5/1979 | Gottlieb et al. | 73/339 |
| 4,360,272 | 11/1982 | Schmadel et al. | 356/352 |
| 4,367,040 | 1/1983 | Goto | 356/44 |
| 4,368,981 | 1/1983 | Ozeki | 356/352 |
| 4,375,164 | 3/1983 | Dodge et al. | 356/44 |
| 4,437,761 | 3/1984 | Kroger et al. | 356/44 |
| 4,462,699 | 7/1984 | Shaw et al. | 374/131 |
| 4,533,247 | 8/1985 | Epworth | 356/345 |
| 4,632,551 | 12/1986 | Pavlath | 356/345 |
| 4,652,129 | 3/1987 | Martinelli | 356/345 |
| 4,673,299 | 6/1987 | Dakin | 374/131 |
| 4,699,513 | 10/1987 | Brooks et al. | 250/227 |
| 4,714,342 | 12/1987 | Jackson et al. | 356/345 |

FOREIGN PATENT DOCUMENTS 2136956 9/1984 United Kingdom ................ 356/345

*Primary Examiner*—David C. Nelms
*Assistant Examiner*—Michael Messinger
*Attorney, Agent, or Firm*—Kerkam, Stowell, Kondracki & Clarke

[57] ABSTRACT

A single fiber optic optical sensor in one segment of a divided interferometer and a remote demodulation interferometer segment associated therewith.

4 Claims, 4 Drawing Sheets

FIBER OPTIC INTERFEROMETRIC THERMOMETER

This is a division of application Ser. No. 915,110 filed Oct. 3, 1986, now U.S. Pat. No. 4,755,668.

BACKGROUND OF THE PRIOR ART

Fiber optic sensors are known in the art and typical sensors are disclosed in the following U.S. Pats.: 4,151,747 Gottlieb et al 4,360,272 Schmadel et al 4,462,699 Shaw et al 4,437,761 Kroger et al 4,375,164 Dodge et al 4,367,040 Goto

THE PRESENT INVENTION

It has been determined that an instrument capable of continuously and accurately monitoring temperature at multiple locations in and around a tumor during hyperthermia therapy would be very useful. There are presently several methods available for measuring temperature, none being totally satisfactory. These include individual thermistors and fiber optic probes. While all are capable of measuring temperature, none have the provision for a small diameter (<0.5 mm) array of such sensors along the same probe.

The treatment of cancer by hyperthermia is a process by which elevated temperatures in the range 35°–50° C. are used to destroy cancer cells. In addition, the application of heat has also been shown to enhance the effectiveness of other cancer treatments (e.g., radiation and chemotherapy). Since the application of elevated temperatures may also damage healthy tissue, it is important to elevate the temperature of the tumor without overheating the surrounding normal tissue. This requires a means of selectively applying the heat and simultaneously monitoring the temperature in and around the tumor being treated. Various techniques for focusing microwaves are being investigated at the National Cancer Institute and elsewhere. A small diameter linear array of temperature probes is required to monitor the temperature. The present invention provides a unique fiber optic sensor which has the following major features;

Provides the potential for an array of up to five temperature sensors along a single optical fiber,
small size (can be made as small as 0.5 mm in diameter with individual sensors being 1.0 mm long),
resolution of 0.01° C. and an accuracy of ±0.1° C.,
reliable and safe (nonthrombogenic), and dielectric sensors, therefore, measurements can be made in a microwave environment.

The present invention also makes an array of temperature and pressure probes to be mixed along the same optical fiber. Such a probe has application in a variety of catheters (e.g., cardiac output/wedge pressure).

Objects of the present invention include providing a temperature sensor wherein the individual temperature sensors will be capable of measuring temperature with an accuracy of 0.1° C. or better in the temperature range 35° to 50° C.

The therhomometer array can be jacketed with a nonthrombogenic material such as polyethylene or silicone rubber. The diameter will be <0.5 mm and the sensor fiber length 1.0 mm.

The invention may be generally defined as a single fiber optic temperature measuring device comprising: at least a first optical fiber sensor on the single optic fiber, a second optical fiber sensor serially positioned on the single optic fiber, a fiber optical interferometer, means connecting each first and second optical fiber sensors to the interferometer, radiant energy emitting means for directing radiant energy to the sensor through the single optic fiber then to the interferometer; and radiant energy detecting means connected to the interferometer.

BRIEF DESCRIPTION OF THE DRAWINGS

The invention will be more particularly described in reference to the accompanying drawings wherein.

DETAILED DESCRIPTION OF THE INVENTION

Figure 1:
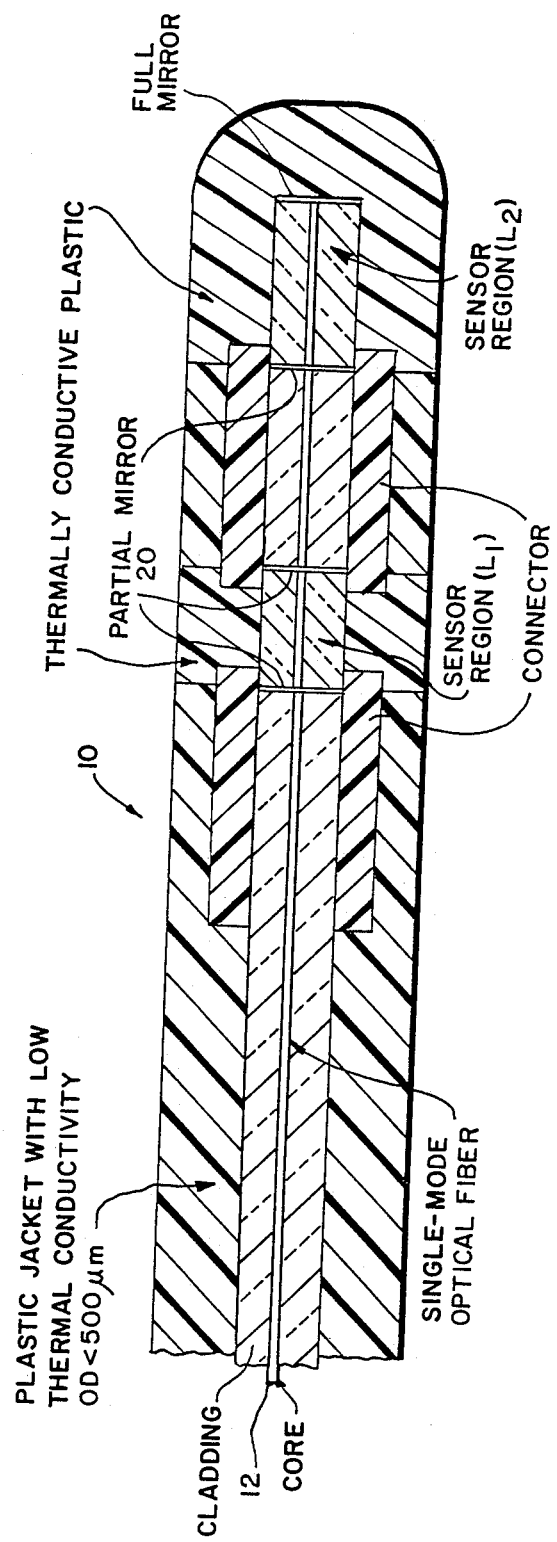
FIG. 1 is a fragmentary diagrammatic view of a two sensor probe.
Figure 2:
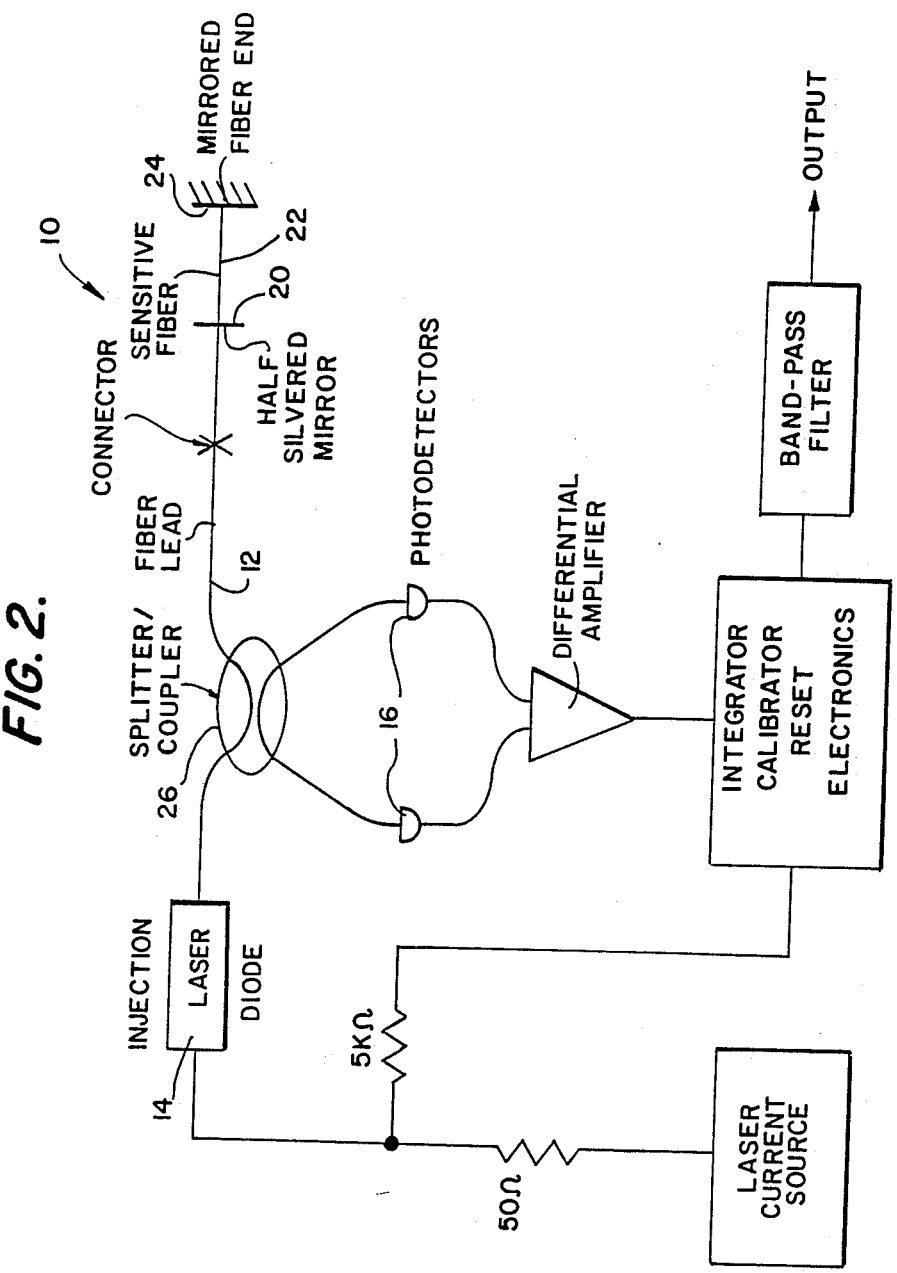
FIG. 2 illustrates a Fabry-Perot interferometer and associated electronics for a single temperature sensor.

Referring to FIGS. 1 and 2 the fiber optic temperature sensor 10 consists of only one optical fiber 12 and a means for enabling the temperature to vary the phase of the light in several well-specified regions of the optical fiber. The system consists of a light source 14, one or more photodetectors 16, a means of demodulating the light, and various other optical components such as couplers, connectors, phase-modulated fiber optic sensors and means for inserting light from the source into the optical fiber.

Phase-modulated fiber optic sensors are highly sensitive means for measuring physical parameters such as temperature and pressure. Since the optical frequency is approximately $10^{14}$ Hz, photodetectors are unable to respond directly to optical phase changes and thus, a means for converting the phase modulation to an amplitude modulation is required. This function is provided by the use of an optical interferometer. In general, optical interferometers require optical sources, optical fiber, couplers, and connectors. At each sensor region, the light from the source is divided by a partial mirror 20, into two parts. One part is used as the phase reference for the other. One of these parts of light is subjected to the environment being investigated. A section of the optical fiber so subjected serves as the temperature probe. The light is then recombined in such a manner that interference occurs, converting the phase-modulated light to intensity-modulated light. The light is then photodetected and the output demodulated.

The Fabry-Perot interferometer as shown schematically in FIG. 2 has two arms which are combined in the same optical fiber. At the end of this optical fiber is a sensor region 22 separated from the remainder of the optical fiber by the half-silvered mirror 20. The other end of the sensor region is fully mirrored as at 24. Thus, light is divided by the half-silvered mirror. One part is reflected back toward the coupler/splitter (3-dB C/S)26 and constitutes the reference beam. The other part is transmitted into the optical fiber sensor portion and constitutes the sensor beam. The sensor beam experiences an added phase shift compared to the reference beam due to the added path length and the effect of the parameter being measured. This sensor component is then reflected by the full mirror at the end, passes once more through the sensor region experiencing an additional phase shift, is transmitted back through the partial mirror, and interferometrically recombined at the half-silvered mirror with the reference beam initially reflected by the half-silvered mirror. Part of the light in the sensor region will be reflected back and forth between the two mirrors before being transmitted back through the half-silvered mirror. Each time the light passes through the phase-sensitive region, it experiences another identical phase shift.

The intensity-modulated light propagates back along the fiber from the partially silvered mirror to the 3-dB C/S where it is divided, one portion going to a second photodiode and another portion going toward the laser. The two components of light that interfere at the partially silvered mirror both travel an equal length through the lead fiber. Thus, the effects of the environment on the lead fiber are cancelled.

The outputs of the two photodetectors 16 are combined in the demodulation/signal-processing circuit that performs such functions as common-mode rejection of amplitude fluctuation, integration, filtering, and other functions required in the demodulation of the optical signal. Out-of-band calibration circuits are also used to maintain proper electronic gain adjustments. Phase-locked-loop feedback techniques are employed to maintain the interferometer at maximum phase detection sensitivity.

Interferometric Sensor Probes

Transduction Mechanism Due to Temperature Induced Length and Refractive Index Changes The transduction mechanism by which temperature induced length and refractive index changes produces a phase change in the light is now discussed. The phase $\Phi$ can be expressed in terms of the refractive index, n, the fiber length, L, and the wave number, k, by the equation:

$$\Phi = knL \quad (1)$$

where $k = 2\pi/\lambda$ and $\lambda$ is the wavelength of light in vacuum. Changes in k, n, and L result in changes in $\Phi$. Temperature or pressure changes applied to the fiber result in changes in n and L and, therefore, in $\phi$.

Generally, temperature changes predominate (a 0.1° C. change in temperature is equivalent to a pressure change of 15 mm Hg) but the two usually can be separated in the frequency domain. Pressure changes associated with blood pulse are $\sim$ 1.0 Hz or greater. The corresponding expression relating these changes is $$\Delta\Phi = k\Delta(nL) = knL(\Delta n/n + \Delta L/L) = \Phi(\Delta n/n + \Delta L/L) \quad (2)$$

where $\Delta L/L$ is the axial strain, $S_{11}$, and $\Delta n/n$ is given by $$\Delta n/n = (\delta n/\delta T)\rho\Delta T/n + (\Delta n/n)_T \quad (3)$$

where $\rho$ is the density and $\Delta T$ is the change in temperature. The term $(\Delta n/n)$ is given by $$(\Delta n/n)_T = -n^2[P_{11} + P_{12})S_{12} + P_{12}S_{11}]_T/2 \quad (4)$$

where $P_{11}$ and $P_{12}$ are the Pockel's coefficients and $S_{12}$ is the radial strain. In Eq. (4) the constant temperature values of $S_{11}$ and $S_{12}$ are used in Eq. (4). Substituting Eqs. (3) and (4) into Eq. (2) and dividing by $\Phi\Delta T$ yields $$\Delta\Phi/\Phi\Delta T = (\delta n/\delta T)\rho/n + S_{11}/\Delta T - n^2(P_{11}+P_{12})S_{12} + P_{12}S_{11}T/2\Delta T \quad (5)$$

The second term Eq. (5) predominates for bare fiber. Measurements have been made for $\Delta\Phi/\Phi\Delta T$ for both and Hytrel jacketed silica fiber. They compared these measurements with calculated values obtained from Eq. (5). For the bare fiber the first term on the right side of Eq. (3) predominates. For the Hytrel jacketed fiber the $(\delta n/\delta T)\rho/n$ term contributes 41% but the $S_{11}/\Delta T$ term contributes 77% while the remaining two terms contributes 3.5% and $-22\%$, respectively. The measured temperature dependence of the relative phase change $\Delta/\Phi T$ was found to $$\Delta\Phi/\Phi\Delta T = 0.68 \times 10^{-5}/°C. \text{ (bare) and} \quad (6)$$

$$\Delta\Phi/\Phi\Delta T = 1.80 \times 10^{-5}/°C. \text{ (hytrel jacket)} \quad (7)$$

which agreed with their calculated value to within 3% and 7%, respectively. Furthermore, they have shown that for a soft plastic jacket such as silicone rubber (which exhibits a small Young's modulus) the expression in equation (6) remains essentially the same. Preliminary measurements have verified these results. Solving equation (6) for $\Delta T$, letting $n = 1.46, \lambda_o = 0.83 \times 10^{-4}$ cm, and L=1.0 mm in $\Phi = nkL$ yields $$\Delta T = 13.3\Delta\Phi \quad (8)$$

or 13.3° C. /radian phase change. For a phase shift $\Delta\Phi = 10^{-3}$ radians, which can be realistically detected, the temperature change is $\Delta T = 1.33 \times 10^{-2°C}$. This coupled with a dynamic range of 3 to 4 orders of magnitude yield a maximum temperature range of greater than 100° C., to 130° C. For a value of L equal to 1 mm, the above values of $\Delta T$, and the temperature range apply. For a probe length of 1.0 cm, the above values will all be reduced by a factor of 10.

In the case of conventional interferometers discussed above, the optical path lengths are matched to within the coherence length of the optical source; thus, when the output of the two arms are recombined, interference occurs. For CW operation of such an interferometer, only a single sensor can be located on a given optical fiber. There are many applications, however, where it would be highly desirable to locate several sensors on a single fiber. The temperature probe considered here is just such an example.

Figure 3:
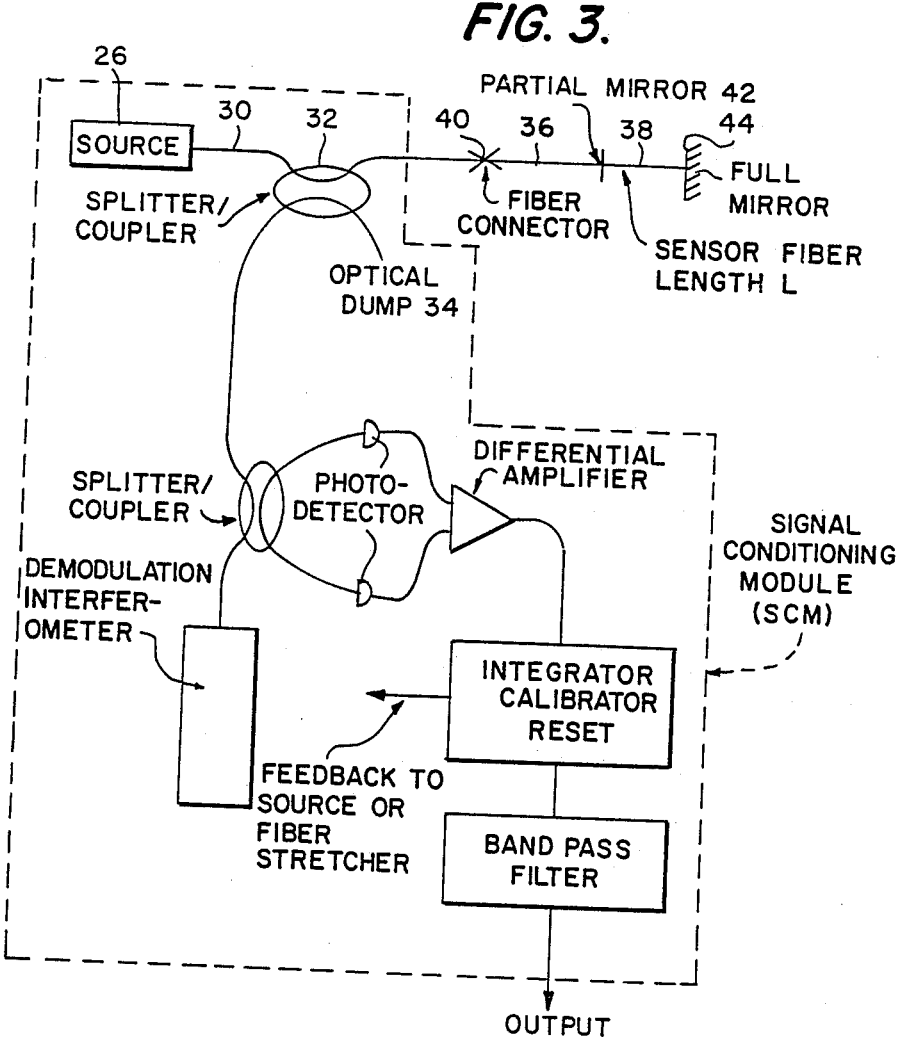
FIG. 3 illustrates a divided interferometer.

The sensor concept described below will allow more than one sensor to be located on a single fiber. It involves the use of a divided interferometer (see FIG. 3). That is, an interferometer formed by two widely separated units: (1) a sensor probe and (2) a unit consisting of the optical source, demodulator interferometer, and the signal-conditioning module (SCM). Unlike the case with the conventional interferometer, the optical source must have a coherence length significantly less than the length of fiber in the sensor probe (hereafter referred to simply as the sensor fiber). The basic principle is illustrated in FIG. 3. Light from the optical source 26 is coupled into a single-mode optical fiber 30 and divided by the four-port 3-dB coupler/splitter (3-dB C/S) 32. The light from one output port is fed to an optical dump 34 and light from the other output optical port is coupled into the optical fiber lead 36 to the sensor 38. A fiber optic connector 40 is provided in order to allow various probes to be attached and removed. Such a connector is not essential to the operation of the sensor, but is merely convenient. Since short lengths of optical fiber are used, the connector need not be a high-quality, low-loss device.

The sensor fiber is located between two mirrors. The first mirror 42 is partially reflecting and the second mirror 44 is fully reflecting. This arrangement is in the form of a Fabry-Perot cell. The light propagates in the lead fiber to the partially reflecting mirror where part is reflected and the remainder transmitted. The latter part propagates through the sensor fiber, reflects off the full mirror, and propagates back through the sensor fiber. This light is again divided by the partial mirror. A portion is reflected back into the sensor and another portion transmitted through the partial mirror into the optical fiber lead where it is recombined with the light initially reflected. Since the two optical components travel paths which differ in length by 2L, a distance much greater than the coherence length of the source, they do not interfere with each other. However, they do experience different phase shifts. This is different from the case described in references to FIG. 2 where interference occurred at the partial mirror. In that case, the coherence length of the laser was greater that 2L while in the present case it is much less that 2L. There are two important advantages. First low-cost, short coherence length light sources can be used. However, more importantly, several sensors can be arranged along the same fiber and the signal from each extracted simultaneously in the SCM. A separate demodulation interferometer is provided in the SCM for each sensor (see FIG. 4). The output of a given demodulation interferometer provides the signal from a specific sensor. This is accomplished by creating sensor probes of different lengths $L_1, L_2 \ldots L_n$ arrayed along the same fiber. A separate demodulation interferometer is provided for each. All lengths $L_1, L_2, \ldots L_n$ must be much less than the coherence length of the optical source and no one of these lengths an integer multiple of another. Thus, the individual sensors can be monitored separately. In general, the jacket material chosen for the sensor fiber is one that increases the sensitivity of the sensor fiber to the parameter (temperature) being detected such as silicone rubber. Phase shifts and amplitude modulation which occur in the lead fiber are identical in each optical component and thus cancel.

Figure 4:
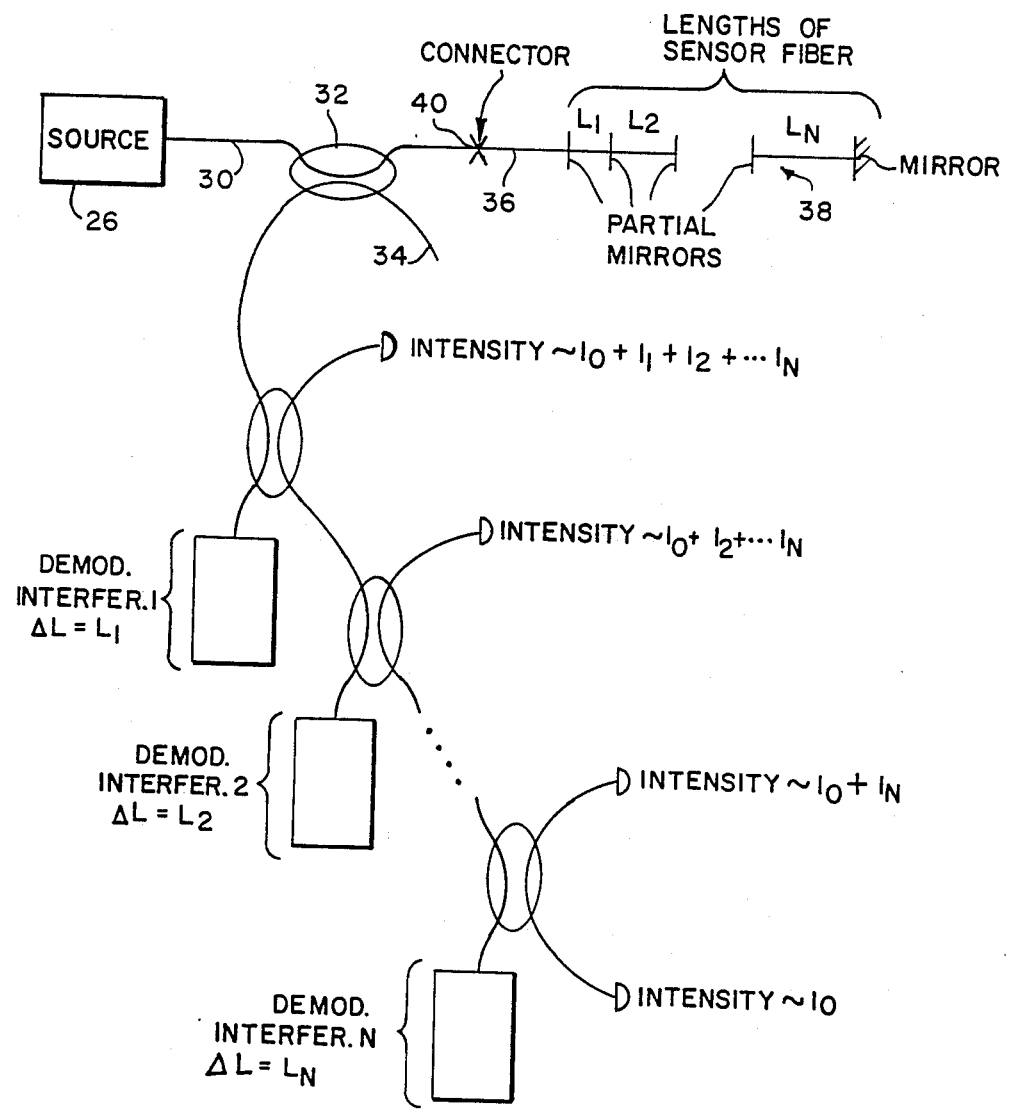
FIG. 4 illustrates a multiple sensor divided interferometer.

The light, recombined at the partial mirror in FIG. 4, travels back through the lead fiber to the 3-dB C/S 32 where it is again split. Part propagates back to the source and the other part to the demodulation interferometer.

Figure 5:
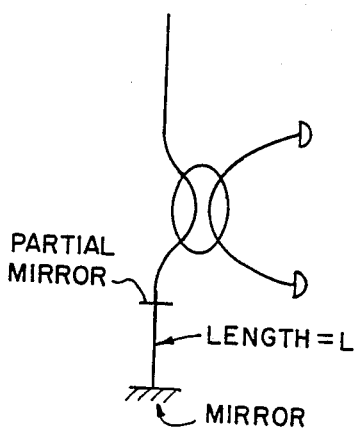
FIGS. 5 and 6 illustrate two forms of demodulation interferometers.
Figure 6:
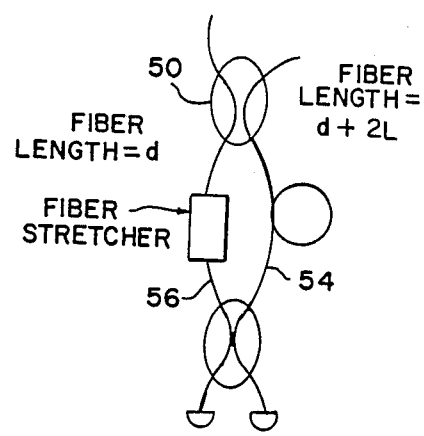

Two embodiments of the demodulation interferometer are shown in FIGS. 5 and 6. In FIG. 5 there is shown a Fabry-Perot type demodulation interferometer which corresponds to those illustrated in FIG. 4. The optical path length difference between the two arms in the demodulation interferometer is 2L. Consider the example shown in FIG. 6. The demodulation interferometer has Mach-Zehnder geometry while the sensor probe has Fabry-Perot geometry. Light reaching the upper 3-dB C/S in the demodulation interferometer is divided as in the case of the sensor probe. The light at this point is composed of a portion that was reflected from the partial mirror of the sensor probe and another portion that made two or more passes through the sensor fiber. Interference will occur at the lower 3-dB C/S 52 of the Mach-Zehnder demodulation interferometer between that part of the light reflected from the partial mirror of the sensor probe and then passing through the Mach-Zehnder arm 54 of length d+2L and that part of the light which propagates a distance 2L through the sensor fiber and then through the Mach-Zehnder arm 56 of length d. Both of the optical components will have traveled the same distance, 2L+d, through the interferometers combined. The output of the Mach-Zehnder demodulation interferometer will exhibit amplitude modulation proportional to the magnitude of the temperature being detected by the sensor probe.

I claim:

1. Fiber optic temperature measuring devise comprising, a single optic fiber for the input of light to a first leg of a divided interferometer, an optical fiber sensor in said first leg of the divided interferometer, and an interferometer means remote from the sensor to receive light from the said single optical fiber, said interferometer means coupled and matched in length to said optical fiber sensor.

2. The fiber optic temperature measuring device as defined in claim 1 wherein the remote interferometer means has a Michelson configuration.

3. The fiber optic temperature measuring device as defined in claim 1 wherein the remote interferometer means has a Mach-Zehnder configuration.

4. The fiber optic temperature measuring device as defined in claim 1 wherein the remote interferometer means has a Fabry-Perot configuration.

* * * * *